Figure 1:
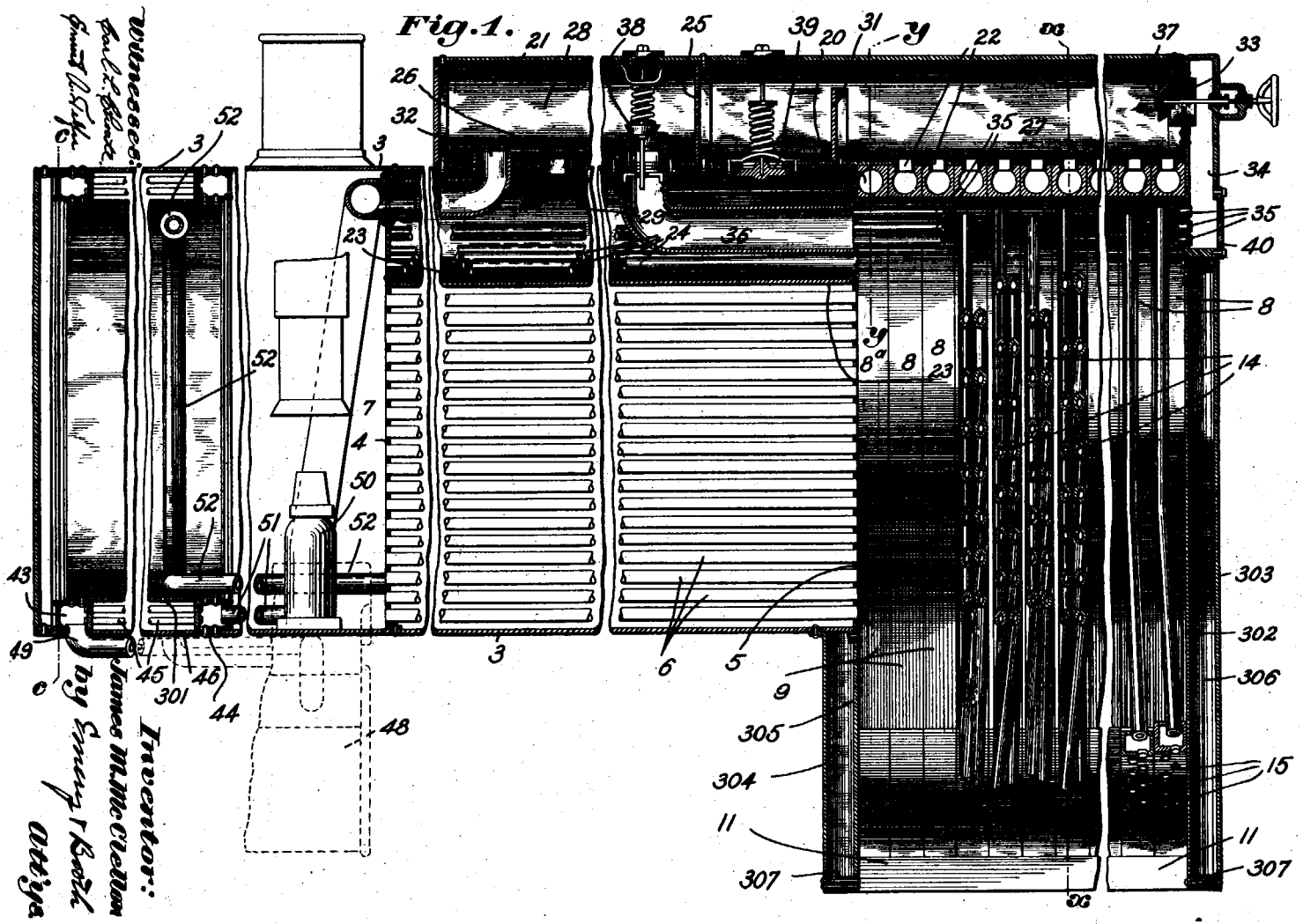

J. M. McCLELLON.

LOCOMOTIVE BOILER.

APPLICATION FILED OCT. 25, 1909.

Reissued Feb. 21, 1911.

13,211.

7 SHEETS—SHEET 1.

THE NORRIS PETERS CO., WASHINGTON, D. C.

J. M. McCLELLON.

LOCOMOTIVE BOILER.

APPLICATION FILED OCT. 25, 1909.

Reissued Feb. 21, 1911.

13,211.

7 SHEETS—SHEET 2.

Witnesses
Carl L. Choate,
Ernest A. Telfer

Inventor
James M. McClellon
by Emery T. Booth Attys.

THE NORRIS PETERS CO., WASHINGTON, D. C.

J. M. McCLELLON.
LOCOMOTIVE BOILER.
APPLICATION FILED OCT. 25, 1909.
Reissued Feb. 21, 1911.
13,211.
7 SHEETS—SHEET 3.
Fig. 3.
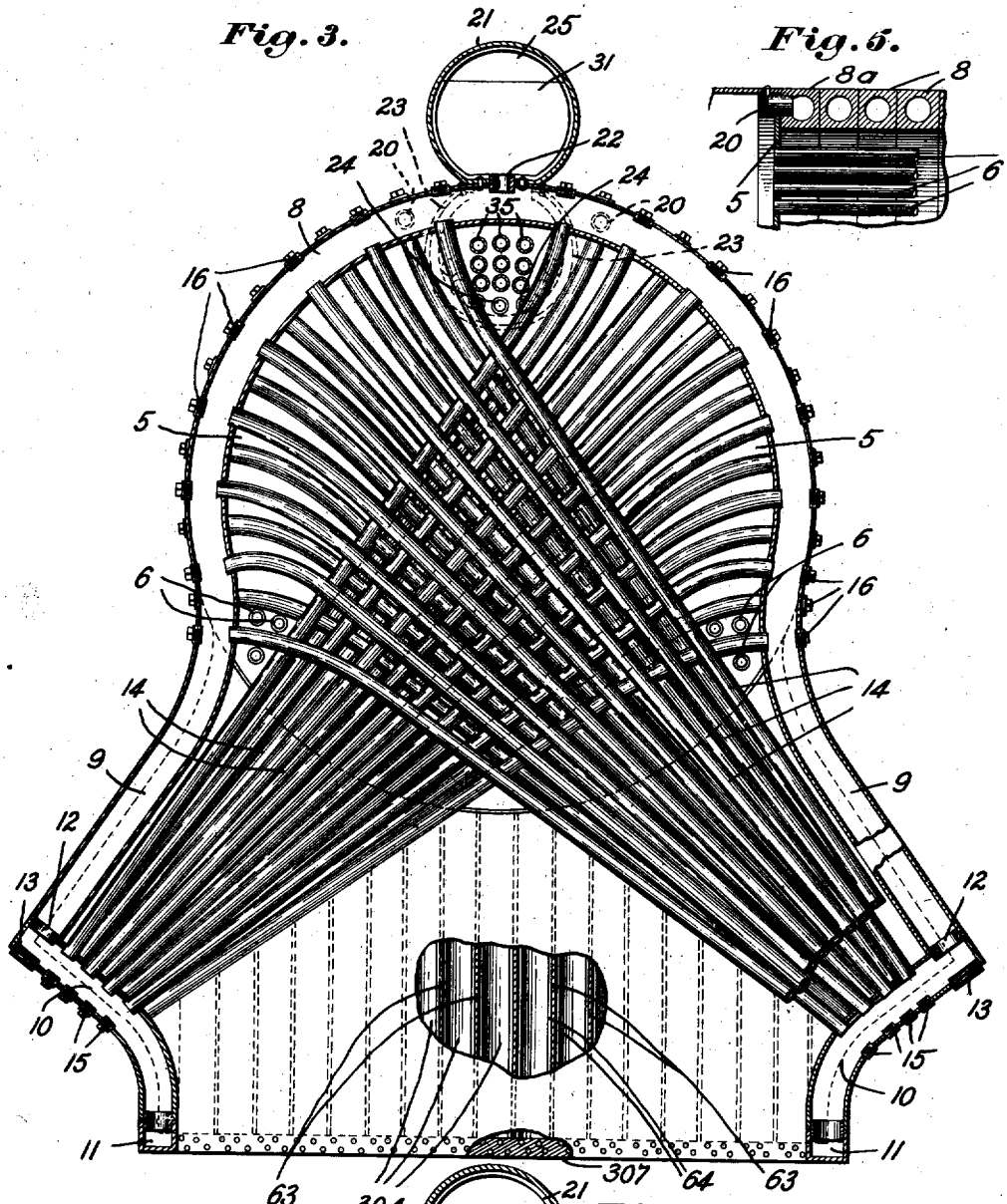
Fig. 6.
Fig. 4.
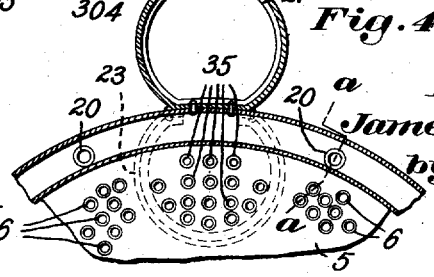
Witnesses:
Carl L. Choate
Ernest A. Tuffer
Inventor:
James M. McClellon
by Emery & Booth
Attys.
THE NORRIS PETERS CO., WASHINGTON, D. C.

J. M. McCLELLON.

LOCOMOTIVE BOILER.

APPLICATION FILED OCT. 25, 1909.

Reissued Feb. 21, 1911.

13,211.

7 SHEETS—SHEET 4.

Witnesses:
Carl L. Choate.
Ernest A. Telfer

Inventor:
James M. McClellon
by Emery + Booth
Attys.

THE NORRIS PETERS CO., WASHINGTON, D. C.

J. M. McCLELLON.
LOCOMOTIVE BOILER.
APPLICATION FILED OCT. 25, 1909.
Reissued Feb. 21, 1911.
13,211.
7 SHEETS—SHEET 5.
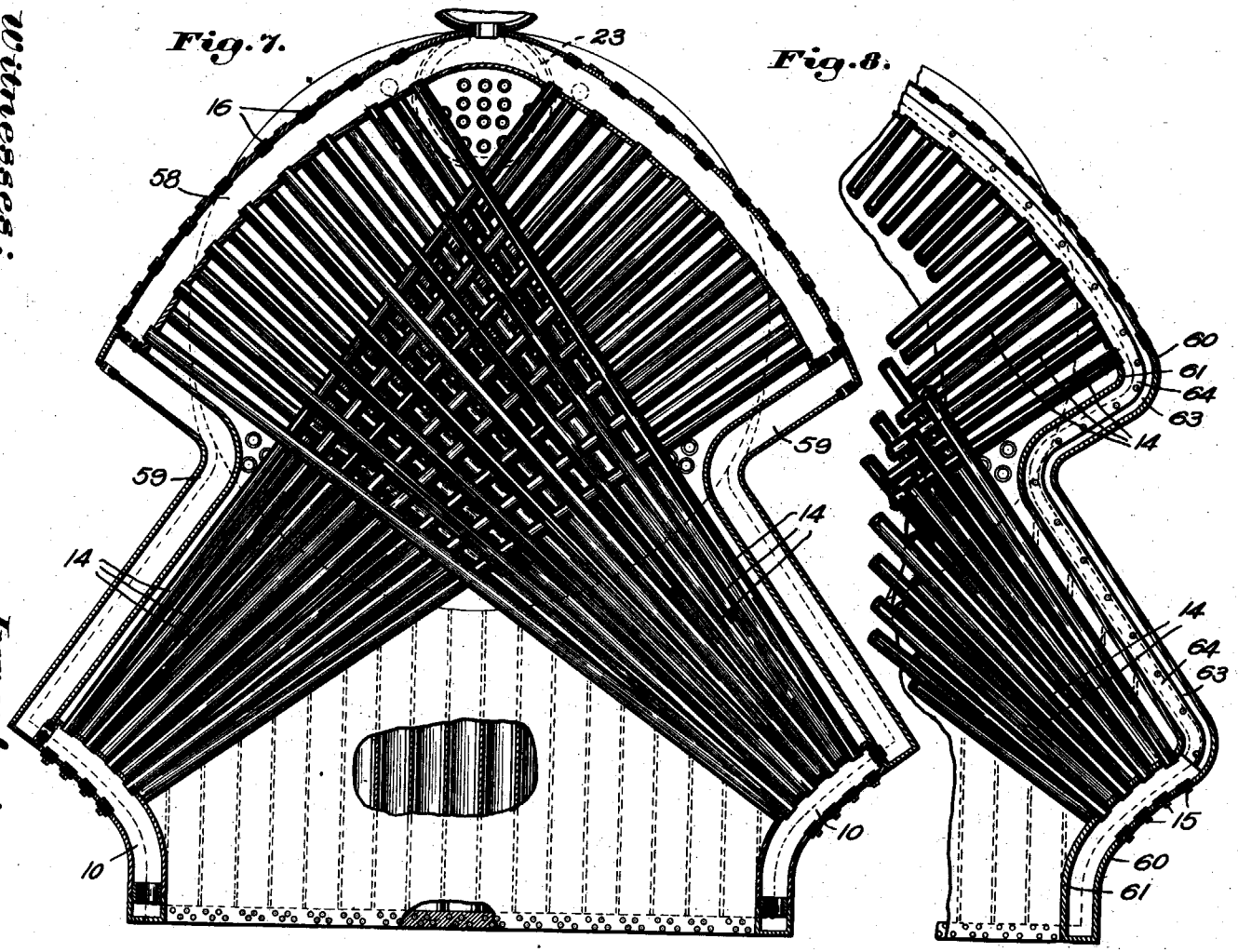
Witnesses:
Carl L. Choate.
Ernest A. Telfer
Inventor:
James M. McClellon
by Emery T. Booth
Attys.
THE NORRIS PETERS CO., WASHINGTON, D. C.

J. M. McCLELLON.
LOCOMOTIVE BOILER.
APPLICATION FILED OCT. 25, 1909.
Reissued Feb. 21, 1911.
13,211.
7 SHEETS—SHEET 6.
Fig. 10.
Fig. 9.
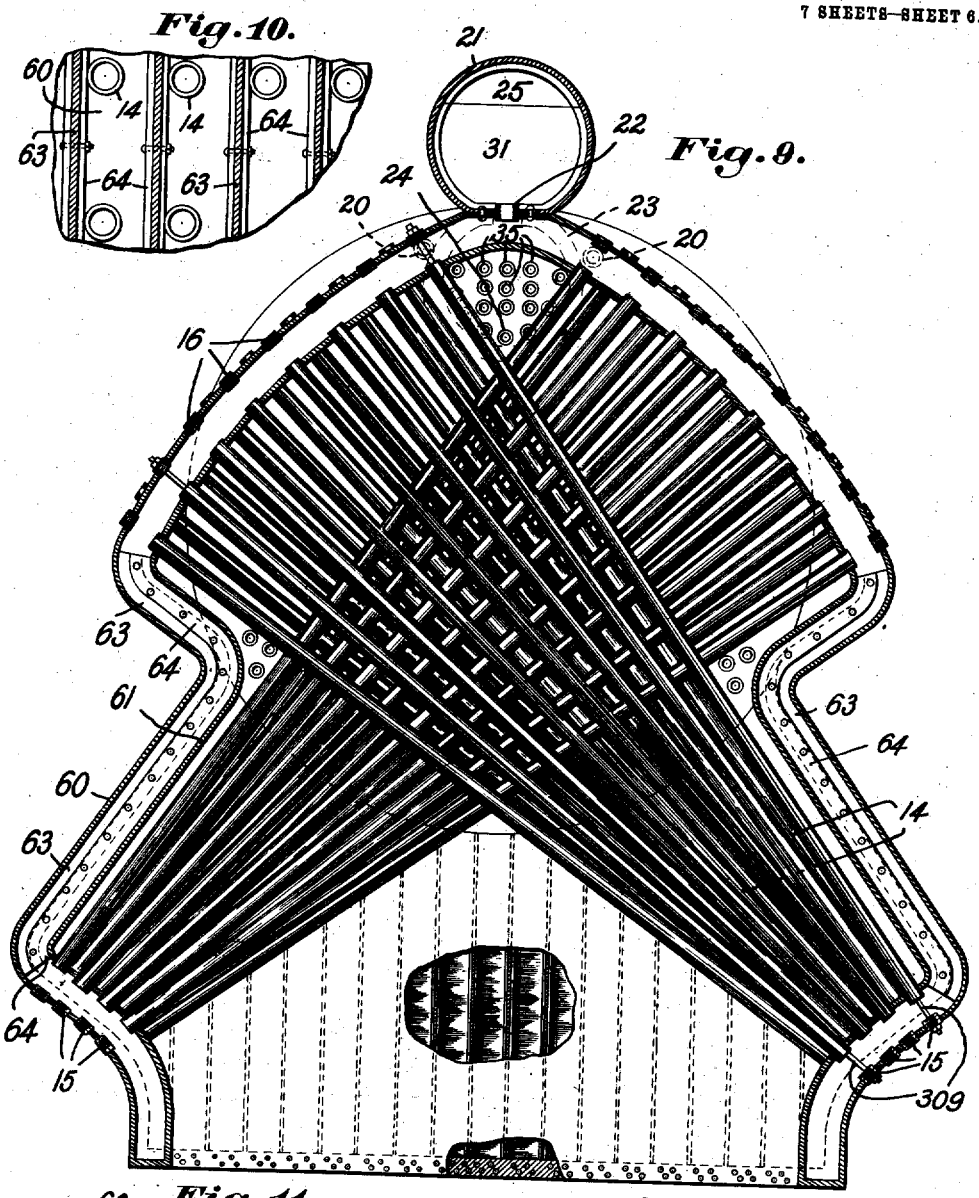
Fig. 11.
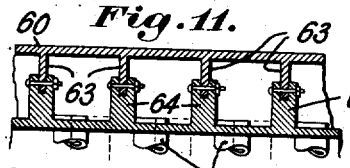
Fig. 12.
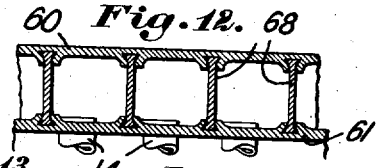
Fig. 13.
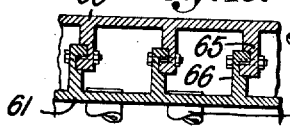
Witnesses:
Carl L. Choate.
Ernest A. Telfer
Inventor:
James M. McClellon
by Emery & Booth
Att'ys.
THE NORRIS PETERS CO., WASHINGTON, D. C.

J. M. McCLELLON.

LOCOMOTIVE BOILER.

APPLICATION FILED OCT. 25, 1909.

Reissued Feb. 21, 1911.

13,211.

7 SHEETS—SHEET 7.

Witnesses:

Carl L. Choate

Ernest A. Telfer

Inventor:

James M. McClellon by Emery T. Booth

Att'ys.

THE NORRIS PETERS CO., WASHINGTON, D. C.

UNITED STATES PATENT OFFICE.

JAMES M. McCLELLON, OF EVERETT, MASSACHUSETTS.

LOCOMOTIVE-BOILER.

13,211. Specification of Reissued Letters Patent. Reissued Feb. 21, 1911.

Original No. 870,455, dated November 5, 1907, Serial No. 216,315. Application for reissue filed October 25, 1909. Serial No. 525,287.

*To all whom it may concern:*

Be it known that I, JAMES M. McCLELLON, a citizen of the United States, residing in Everett, in the county of Suffolk and State of Massachusetts, have invented an Improvement in Locomotive-Boilers, of which the following description, in connection with the accompanying drawings, is a specification, like letters on the drawings representing like parts.

In making the present invention I have undertaken to devise a locomotive boiler in which the most economical use possible will be made of the heat generated in the fire-box, and the greatest possible number of heat units will be utilized in converting the water into steam and drying or superheating the steam before it is delivered to the engine cylinders. Most locomotive boilers are constructed with a barrel or shell having a fire-box at one end and with fire tubes or flues extending through the barrel or shell to conduct the hot gases from said fire-box to the smoke chamber. The space around the fire-box communicates directly with the shell and the steam is generated both in the shell and in said space. Such a construction does not lend itself to the most economical use of the heat generated in the fire-box and many valuable heat units are wasted through the smoke stack. In order to gain a more economical use of the heat generated, I propose to utilize the barrel of the boiler as a means for heating the water and to provide for generating all the steam at the fire-box end of the boiler. For this purpose I provide steam and water spaces around the fire-box in which the steam is generated and which are separated from the barrel or shell, and I arrange to deliver the water first to the barrel or shell where it is heated to substantially boiling point and then provide for delivering said water from the shell to the steam-generating spaces around the fire-box where it is generated into steam. From the steam-generating spaces the steam accumulates in the steam dome from which it is taken to the engine cylinders as usual.

In the preferred embodiment of my invention the arrangements are such that the barrel of the boiler is maintained always full of water and no steam whatever is generated therein, this barrel being utilized solely for the purpose of heating the water to a point where a very little added heat will convert it into steam.

In order to make further use of the heat generated in the fire-box I may if desired equip the boiler with a feed water heater which gives the water an initial heating before delivering it to the barrel or shell of the boiler, and in the embodiment of the invention herein illustrated, I have shown such a feed water heater in which the water is adapted to be initially heated by the exhaust steam. I have also illustrated a means for superheating the steam after it is made and prior to delivering it to the engine.

I have illustrated herein some embodiments of my invention which I will now describe, and I will then point out the novel features of the invention in the appended claims.

Figure 2:
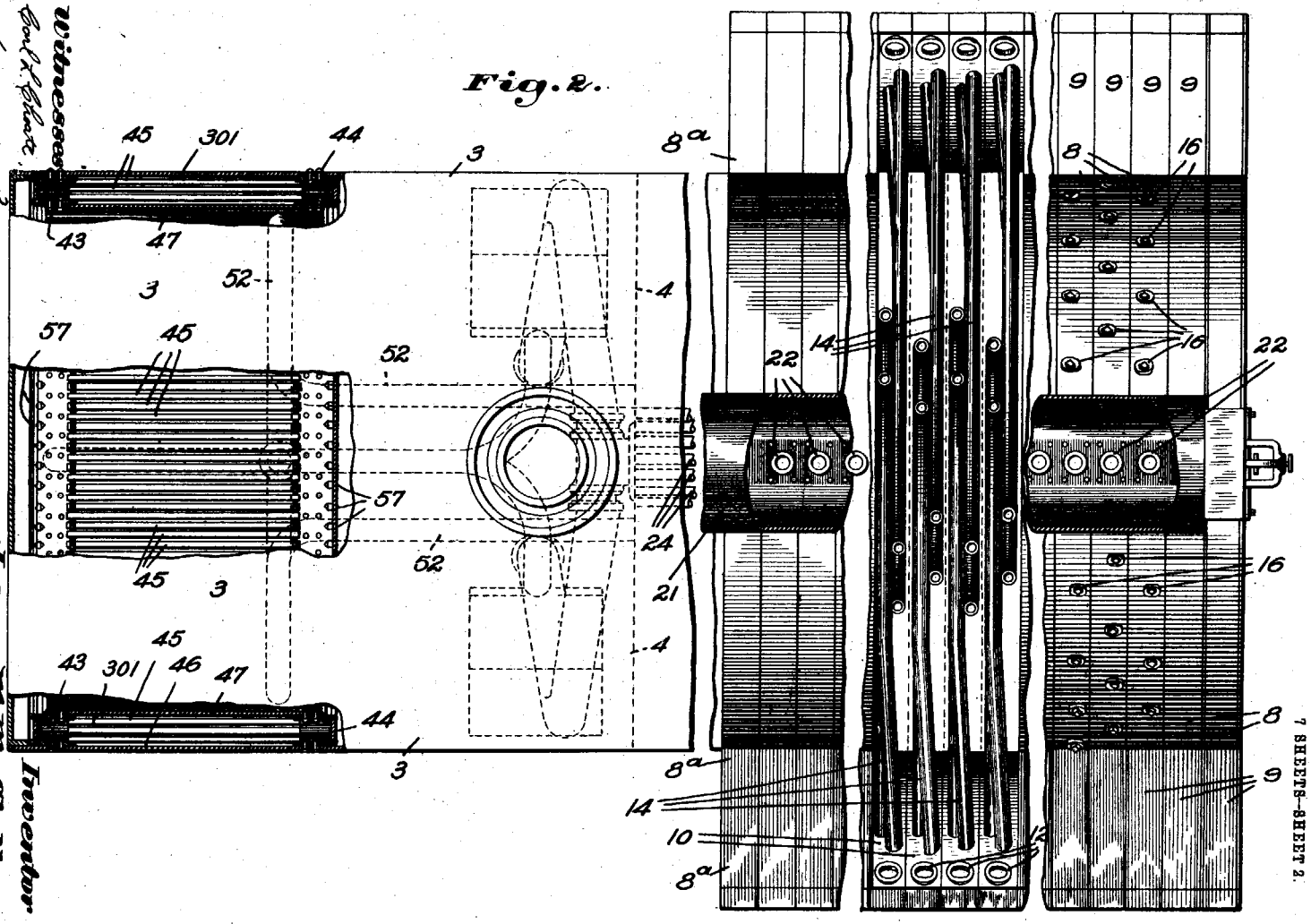
Figure 6:
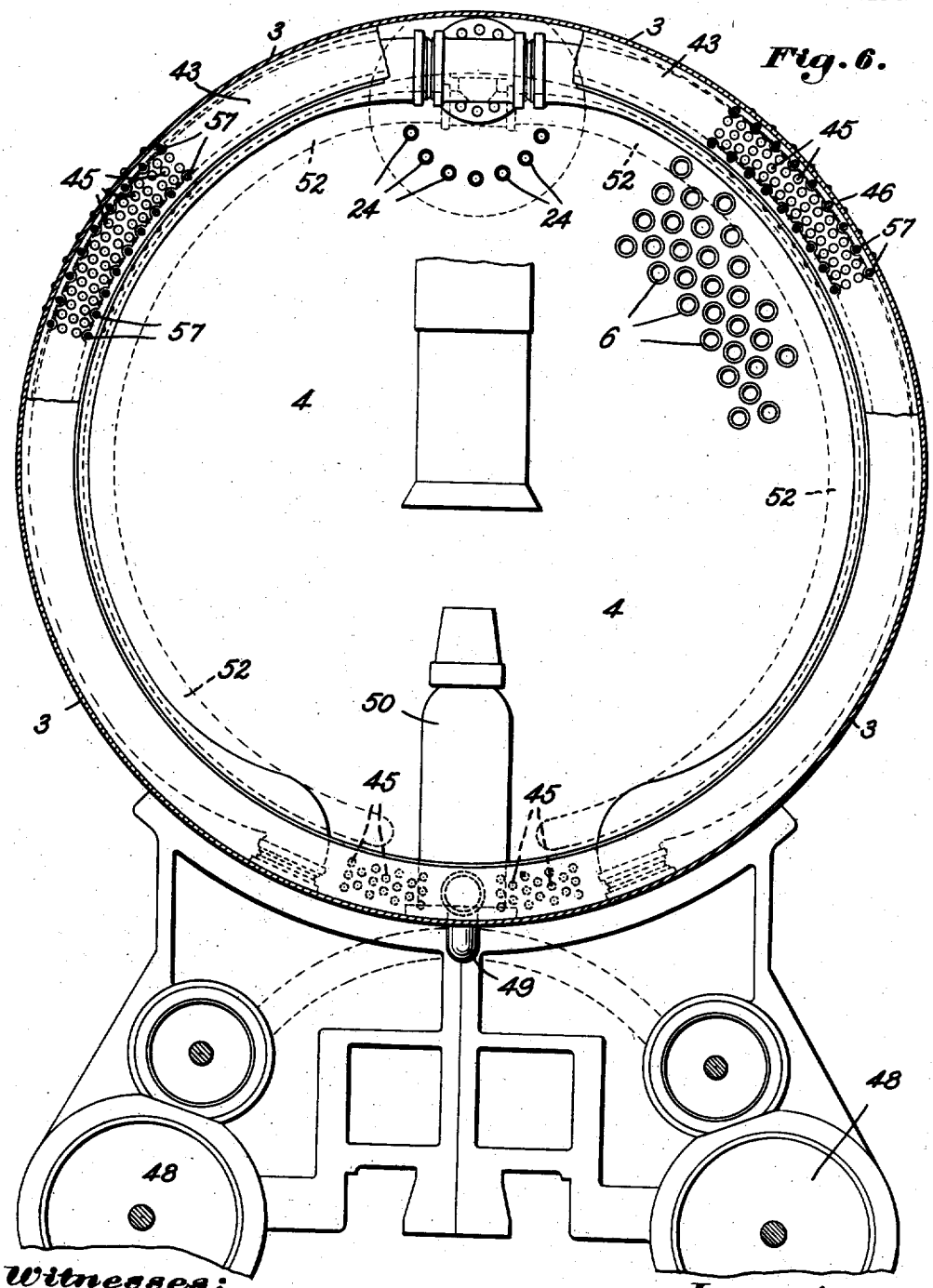
Figure 14:
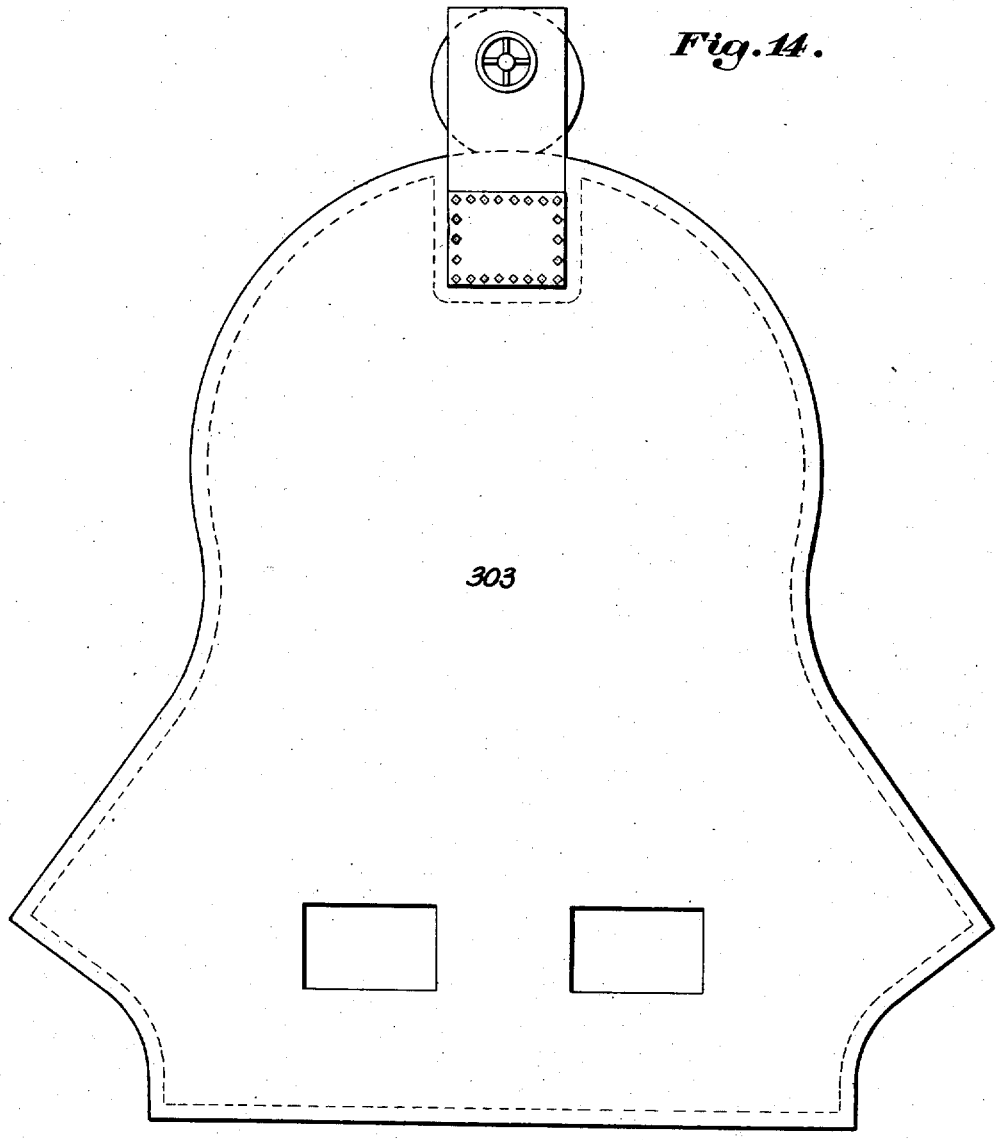

Referring to the drawings, Figure 1 is a longitudinal vertical section of my improved boiler; Fig. 2 is a plan view with parts broken out to better show the interior construction; Fig. 3 is a transverse section through the fire-box on substantially the line *x—x*, Fig. 1; Fig. 4 is a section on line *y—y*, Fig. 1, through the steam drum and upper portion of the boiler showing the arrangement for superheating; Fig. 5 is a section on the line *a—a*, Fig. 4; Fig. 6 is a section on the line *c—c*, Fig. 1; Fig. 7 is a section transversely through the fire-box showing a slightly different construction than that illustrated in Fig. 3; Fig. 8 illustrates another embodiment of my invention; Fig. 9 is a view similar to Fig. 3 showing a still different construction of fire-box; Figs. 10, 11, 12 and 13 show different ways of staying the shells forming the sides of the fire-box shown in Fig. 9; Fig. 14 is an end view of the fire-box.

The boiler shell, or as I have termed it the "water-receiving shell" is designated by 3 and is preferably cylindrical in shape similar to the barrel of an ordinary locomotive boiler.

In the present form of my invention this boiler-shell has at its forward end a flue-sheet 4 and at its rear end a flue-sheet 5 into which are secured the usual flues 6 which connect the combustion chamber of the fire-box with the smoke-chamber 7 and through which the heated products of combustion pass as usual. This water-receiving shell is intended to be completely filled with water and to act only as a water-heating portion of the boiler and not as a steam-generating portion, as will be presently described more fully. From the water-receiving shell the heated water passes to the steam-generating portion of the boiler which is situated around the fire-box. The water-heating portion, it will be observed, extends from the flue sheet 5 to the smoke chamber, and therefore said water-receiving chamber terminates at the fire-box. The steam generating portion which will now be described is situated entirely at the fire-box of the boiler, and in the embodiment illustrated it comprises steam-generating spaces or chambers at the sides and top of the fire-box, and water-tubes within the fire-box. The steam generating spaces at the sides and top of the fire-box may be formed by headers or manifold-tubes, or by sheets or plates. In the form of the invention shown in Figs. 1, 2 and 3, the sides and top of the fire-box are formed by headers or manifold-tubes 8 which are preferably flat-sided so that they can be set close together, and which have a substantially inverted U-shape, the upper portions of said manifolds being curved to correspond to the contour of the shell 3, and the lower ends 9 being flared outwardly (see Fig. 3). Connected to the said outwardly flared lower ends 9 are other short manifold-tubes or headers 10 curved substantially as shown in Fig. 3 and connected at their lower ends to longitudinal headers 11 which extend along the sides of the fire-box at its bottom.

The ends 9 of each manifold-tube 8 may be secured to the manifold-tubes or headers 10 in any suitable way, and in Fig. 3 I have illustrated them as nippled thereto by suitable nipples 12, said manifolds or headers 10 being provided with removable plugs 13 opposite the nipples so that when said plugs are removed access may be had to the nipples for expanding them in place or cutting them out as required. The headers 10 may be similarly connected to the headers 11.

Situated within the fire-box are a plurality of oppositely inclined water-tubes 14 which connect the manifolds 8 to the manifolds 10. These tubes are preferably arranged at substantially an angle of 45°, and in alternate courses or rows which cross each other at substantially right angles.

One series or row of tubes connects each header or manifold 10 on one side of the boiler to the corresponding header or manifold 8 on the opposite side of the boiler, so that each header or manifold 8 has connected thereto two series of tubes inclined in opposite directions, one series being connected at its lower end to one of the manifolds or headers 10 corresponding to said manifold 8, and the other series of tubes 14 being connected to the other manifold 10.

In the form of the invention shown in Fig. 3, each row or series of tubes 14 presents a fan-like appearance, that is the tubes are very close together at their lower ends where they are expanded or otherwise secured to the header or manifold 10, but are more separated where they expand into or are secured to the header or manifold 8. I propose to make each manifold or header 10 of sufficient size so that the water-tubes 14 of any bank may be staggered with relation to each other where they are secured to said header 10, as best shown in Figs. 1 and 3, and in order to enable the two rows of crossed tubes 14 which are secured to any one header or manifold 8 to pass each other it will be necessary to bend the tubes slightly, as shown in Fig. 1, the width of the manifolds 8 being sufficient to permit this. I also prefer to stagger the tubes 14 of the banks which are secured to the successive or adjacent tubes 4, as seen in Figs. 1 and 3.

The curvature and position of the headers or manifolds 10 are such that the tubes 14 extend at substantially right angles thereto, and each header 10 will be provided opposite each tube 14 with a removable plug 15 so that access may be had to the lower end of said tube 14. The upper ends of the tube 14 are bent so that they extend into the manifolds or headers 8 at right angles thereto, and each manifold or header 8 is provided with removable plugs 16 opposite the upper end of each tube 14. With this construction any tube 14 can be readily removed and a new tube inserted in case such action is necessary, without the necessity of disturbing any other tube and also all the tubes can be readily cleaned.

The door end of the fire-box as well as the opposite end may be formed of closely arranged water-tubes or of sheets. It is the latter construction which I have illustrated in the drawings, and 302 and 303 represent the sheets at the door end of the fire-box between which is the water-space 306, and 304 represents the sheets at the opposite end. One of the sheets 304 may be part of the flue sheet 5 which is extended below the shell 3 and properly shaped to form with the other sheet 304 the water-space 305. Said sheets are secured at their edges to filling-pieces 307, as usual, and are provided with any suitable stay devices.

Those tubes 8 which are nearest to the flue-sheet 5 preferably will not have any tubes 14 connected thereto, as seen in Fig. 1, so that a free space is left at the end of the flue 6 for the products of combustion to enter. These tubes 8 to which no water-tubes 14 are connected do not, therefore, have the function of headers or manifolds but are water-tubes only. The other tubes 8, however, constitute headers or manifolds for the various tubes 14.

Suitable provision is made for taking the water from the top of the shell 3 and delivering it to the various tubes and headers forming the sides of the fire-box, preferably at the lower end thereof so that the feed-water which is delivered to the lower end of the shell 3, above explained, rises in said shell 3 and is then taken from the top thereof through the steam-generating spaces of the fire-box.

Various ways of connecting the steam-generating spaces to the shell to accomplish this may be employed. I prefer, however, to connect the tube nearest the shell, which tube I have designated as 8ª, directly to said shell, so that the water from the top of the shell will flow into said tube and down the legs thereof to the longitudinal headers 11 and from said headers forward to and up through the other tubes or headers 8 and tubes 14. The tube 8ª, therefore, forms a connecting medium between the water-receiving shell 3 and the other tubes or headers 8. The connection between the tube 8ª and the water-receiving shell is herein provided for by means of one or more nipples 20 which extend through the front flue-sheet 5 and through the adjacent side of the tube 8ª.

Situated above the fire-box and also partially over the water-receiving shell 3 is a steam-drum 21, which also has the function of a steam-dome. This drum is preferably cylindrical and is riveted to the shell 3 and to the tube 8ª and manifolds 8, said drum being curved on its underside to fit the curvature of the shell and manifolds, as best shown in Fig. 4.

Each of the manifolds and tubes 8 has direct communication with the drum through suitable apertures into which are expanded nipples 22 to guard against any possible leakage. The tube 8ª, however, has no communication with the drum as this tube is utilized to conduct the hot-water from the top of the shell 3 to the steam-generating portion of the boiler. With this construction all the steam which is generated in the tubes 14 and manifolds 8ª passes directly to the drum through said nipples 22.

The steam is taken from the steam dome to the cylinders, as will be presently described. With the arrangement thus far described the water which is delivered to the shell 3 is heated to boiling point within said shell and the hottest water in the top of the shell is delivered over into the steam-generating spaces around the fire-box where it is rapidly converted into steam as will be obvious. From these steam generating spaces the steam passes to the steam drum, as described above.

In order to increase the efficiency of the locomotive boiler I may if desired employ within the smoke chamber a feed water heater which serves to give the water a preliminary heating before it is delivered to the shell 3. As herein shown I have arranged the feed water heater so that it makes use of the exhaust steam for initially heating the water. The form of feed water heater I preferably employ comprises a ring-like or annular member situated within the forward end of the barrel of the locomotive and having adjacent annular steam and water chambers, the steam chamber of which is connected to the cylinders. In this embodiment of my invention, said feed water heater comprises two circular headers 43 and 44 which are situated within the forward end of the barrel of the locomotive and which are connected by a plurality of pipes 45, said headers forming with the barrel shell 46 and a circular sheet or plate 47, which is riveted or otherwise secured to the headers, an annular chamber through which the tubes 45 pass.

In the form of the invention shown in Fig. 1, the exhaust steam from the cylinders 48 (shown in dotted lines) passes through the pipe 49 into the header 43 and from said header through the various pipes 45 to the header 44 from which it is delivered to the usual nozzle 50 by means of a pipe 51. The force with which the steam is exhausted into the lower portion of the header 43 will drive the most of it up the sides of said header toward the top so that the entire header is filled with steam. Said steam then passes through all the tubes 45 into the header 44 and from the latter to the nozzle as above described. The feed water is delivered to the space or chamber 301 between the headers, the sheet 47 and the shell 46, at the under side of the boiler and completely fills said space, the hottest water in said chamber of course rising to the top. Connected to the upper portion of the water chamber is a pipe 52 which extends to and opens into the water chamber of the shell 3 at the lower end thereof, as best seen in Fig. 1, so that the hottest water from the chamber 301 is delivered to the lower portion of the water chamber of the shell. This particular form of feed water heater, however, is not essential to the invention. Since the feed water heater is located within the smoke chamber, the water therein is heated not only by the exhaust steam, as above described, but also by hot gases within the smoke chamber. To further increase the efficiency of the boiler, I propose to use a means for superheating the steam after it has accumulated in the steam drum 27 and before it is delivered to the engine cylinder. In the embodiment herein illustrated the shell 3 has situated within it a steam chamber 29 which is entirely separate from the water space within said shell and which is formed by a suitable partition 23 which extends the full length of the shell and divides it into the water chamber and steam chamber. This partition may have various shapes, and in the preferred form of my invention it is substantially circular in cross-section, as shown in dotted lines in Fig. 3. Extending through the steam space of the shell are a plurality of flues 24 which connect the upper end of the combustion chamber with the upper end of the smoke-chamber and through which flues heated products of combustion pass.

The steam-drum 21 is preferably divided midway in its length by a vertical partition 25, the space 27 one side of said partition having communication through the nipples 22 with the tubes or manifolds 8, and the space 28 the other side of said partition having communication through suitable nipples or passageways 26 with the steam-space 29 of the shell 3.

In Fig. 1, I have shown a different form of my invention in which the space 27 of the drum communicates through a passage 33 with a chamber 34, and said latter chamber is connected by pipes 35 with a pipe 36 leading into the space 28 of the drum. These steam-pipes 35 it will be noticed extend through the upper portion of the fire-box between the upper ends of the opposite banks of tubes 14, see Fig. 4, and are thus subjected to a very intense heat with the result that during its passage from the space 27 to the space 28 of the drum the steam is very considerably, if not entirely, dried and superheated. After the steam reaches the chamber 28 it may circulate into and through the steam-space 29 of the shell 3 and be still further dried and superheated before being taken to the cylinder through the pipe 32.

The passage 33 is preferably controlled by a suitable valve 37 and the pipe 36 controlled by another valve 38. The valve 37 is preferably a hand-operated valve, and the valve 38 a spring-pressed valve and thus automatic in its action. Another automatic spring-pressed valve 39 normally closes an opening between the space 27 of the drum and the steam-space of the shell 3.

The object of employing the valves 38, 39 and 37 is so that the engine will not be disabled in case one of the tubes 35 blows out, for if the latter occurs the engineer can close the valve 37 thus preventing steam from leaking through the damaged tube, and when this has been done, the valve 38 will automatically close and the valve 39 will automatically open and admit steam from said space 27 directly into the space 29. From the latter space said steam will pass to the steam-space 28, through the passageways 26. I preferably will make the chamber 34 with the removable plate 40 opposite the ends of the tubes 35 so that access to the latter may be had for cleaning or for repair.

In Fig. 4, the tubes or manifolds 8 surrounding the fire-box are U-shaped and extend over the top and sides of the boiler.

In Fig. 7 I have illustrated a slightly different form of the invention in which the top of the fire-box is formed by manifolds or headers 58, and the sides by specially shaped water-tubes 59 which are nippled or otherwise secured at their upper ends to the lower ends of the manifolds 58. These tubes 59, together with the manifolds 58 form the same element as the manifolds 8 in Fig. 4. Said tubes 59 are nippled or otherwise secured at their lower ends to the manifolds or headers 10 to which the lower ends of the water-tubes 14 are secured. In this form of my invention the manifolds 58 and tubes 59 have a little different shape from the manifolds 8 in Fig. 4, this shape being such as to enable me to use tubes 14 which are substantially straight throughout their entire length, it being only necessary to bend said tubes very slightly at their upper ends to bring said ends substantially perpendicular to the manifolds 58. This is something of an advantage as it facilitates the manufacture and repair of the boiler. In other respects the construction shown in Fig. 7 is similar to that already described.

In Figs. 8 and 9 I have shown still another form of the invention in which the sides and top of the fire-box are formed by sheets 60 and 61, which are bent to form the shape desired. In this form of the invention the various tubes 14 will be expanded into the inner sheet 61 and the outer sheet 60 will have at the appropriate places removable plugs 15 opposite the ends of the tubes 14 so that any tube 14 may be removed and a new tube inserted without disturbing any of the other tubes.

Where sheets are employed it will be necessary of course to provide some means for staying them. In Fig. 9 I have illustrated long stay-rods 309 which extend through the tubes 14 and connect with the plugs 15 at the ends thereof for staying the portions of the sheets opposite the ends of said tubes. For staying other portions of said shell I may use ordinary stay-bolts or the means illustrated in Figs. 10 to 13, which comprises, as shown, ribs on the sheets 60 and 61 adapted to interlock with each other. As shown the sheet 60 is formed with inwardly projecting ribs 63 which are bolted or riveted to ribs 64 projecting inwardly from the inner sheet 61, said ribs extending transversely of the boiler.

In Fig. 13 the sheet 60 has the ribs 65 which are shaped to interlock with the corresponding ribs 66 formed integrally with the sheet 61.

In Fig. 12 each of the sheets 60 and 61 are provided with dove-tailed grooves in which stays 68 having dove-tailed ends are fitted.

Where the locomotive boiler is provided with the water shell and steam-generating spaces, as above described, and also is provided with the feed water heater and superheater, the operation thereof is as follows:—The water is fed first into the water-heating portion of the boiler, and in the embodiment of the invention shown in Fig. 1 water would be fed into the chamber 301 through which the steam-pipes 45 pass, the water circulates through and completely fills this chamber and is initially heated therein by the exhaust steam circulating through the headers 43 and 44 and the steam pipes 45. It is my purpose to feed the water into the lower portion of the chamber 301, and the hottest water will, obviously, rise to the top; from the upper portion of this chamber the partially heated water is taken through the pipes 52 into the lower portion of the shell 3, which is the economizer portion of the boiler. In practice the water-space of the shell 3 will be completely filled with water, and the water therein will be still further heated and brought to a temperature of between 300 and 400° F. The hottest water in the shell will, of course, rise to the top and will pass through the nipples 20 into the distributing tube 8[a] and will flow down the legs of the latter and pass into the headers 11, and from them into the manifolds 10 and 8 and the steam-generating tubes 14. These steam-generating tubes 14 are located at the hottest part of the boiler, and since the water is somewhat near 300° temperature when it enters the tubes it will be immediately converted into steam. This portion of the boiler, therefore, operates something like a flash boiler. The steam passes through the tubes 14 and passes into the space 27 of the drum and from the latter through the valve 33 to the chamber 4; from said chamber 4 it passes through the superheating tubes 35 into the spaces 28 of the drum from which space it is taken to the engine cylinders. The steam is superheated on its passage through the superheating tubes 35 and is also maintained hot and dry by the radiation from the flues 24.

Although the shell 3 is divided by a partition (either flat or curved) into steam and water spaces, yet, in practice, the pressure in the two spaces of the shell is substantially equal.

Should any of the superheating tubes 35 fail the valve 37 can be immediately closed thus removing the pressure from said tubes 35, the valve 38 will immediately close thus cutting the tubes 35 entirely out. As the pressure increases in the chamber 27 the valve 39 will open and admit the steam as fast as it is generated to the chamber 29 from whence it passes to the chamber 28. The feed water heater and the superheater, however, are not essential to my invention, and a boiler embodying my invention might be made without these adjuncts.

In order to make the generator tubes in the fire-box most effective I will preferably build an arch over the grates, which arch extends from the flue sheet about two-thirds of the way toward the door end of the fire-box, said arch being constructed to leave a small opening along each side. The bulk of hot gases is, therefore, drawn back under this arch before passing over the same and through the tubes, although a small portion of the hot gases finds its way up through the side openings to heat the lower ends of the tubes.

From the above it will be seen that I have made a locomotive boiler in such a way that the water is heated in the boiler shell and is then transferred to the steam-generating portion of the boiler which is situated entirely at the fire-box. A locomotive boiler having these features is much more economical than a locomotive boiler as commonly constructed, and while I prefer the embodiment herein shown, yet I have illustrated the preferred form of my invention only and have not attempted to illustrate all embodiments thereof.

The particular construction herein shown may also be varied in many ways without departing from the invention which is expressed in the appended claims, some of which are very broad.

The particular form of fire-box herein shown comprising the water and steam spaces at the top and bottom and the crossed-inclined water tubes connecting said water and steam spaces is not claimed herein, but is made the subject of a separate application. Neither have I attempted to show any particular type of superheater as such has been made the subject of a separate application.

Claims.

1. A unitary boiler structure of the locomotive type comprising, in combination, a feed water heater in the form of the usual shell with flues therein; a fire-box at one end of said shell for supplying heat to said flues; a water tube steam generator heated by said fire-box; means to conduct only feed water from said shell to said generator; and means to prevent the steam in said generator from passing into the water space of said shell.

2. A boiler structure of the locomotive type comprising, in combination, a feed water heater in the form of the usual shell with flues therein; a fire-box at one end of said shell for supplying heat to said flues;

a water tube steam generator heated by said fire-box; means to conduct only feed water from said shell to said generator; a steam chamber to receive steam from said generator; and means to prevent the steam in said chamber from passing into the water space of said shell.

3. A unitary boiler structure of the locomotive type comprising, in combination, a feed water heater in the form of the usual shell with flues extended therethrough; a smoke box in communication with said flues at one end of the shell; a fire-box at the opposite end of said shell for supplying heat to said flues; a water tube steam generator heated by said fire-box; means to conduct only feed water from said shell to said generator; and means to prevent the steam in said generator from passing into the water space of said shell.

4. A unitary boiler structure of the locomotive type comprising, in combination, a feed water heater in the form of the usual shell with flues therein; a fire-box at one end of said shell supplying heat to said flues; a water tube steam generator entirely within said fire-box and heated thereby; means to conduct only feed water from said shell to said generator; and means to prevent the steam in said generator from passing into the water space of said shell.

5. A unitary boiler structure of the locomotive type comprising, in combination, a feed water heater in the form of the usual shell with flues therein; a fire-box at one end of said shell supplying heat to said flues and having water and steam chambers forming the sides of said fire-box; means to conduct only feed water from said shell to said chambers; and means to prevent the steam generated therein from passing into the water space of said shell.

6. A unitary boiler structure of the locomotive type comprising, in combination, a feed water heater in the form of the usual shell with flues therein; a fire-box at one end of said shell supplying heat to said flues and having water and steam tubes forming the sides of the fire-box; means to conduct only feed water from said shell to said tubes; and means to prevent the steam in said tubes from passing into the water space of said shell.

7. A unitary boiler structure of the locomotive type comprising, in combination, a feed water heater in the form of the usual shell with flues therein; a fire-box at one end of said shell supplying heat to said flues and having a plurality of water and steam chambers forming the sides and top of the fire-box; means to conduct only feed water from said shell to said chambers; and means to prevent steam in said chambers from passing into the water space of said shell.

8. A unitary boiler structure of the locomotive type comprising, in combination, a feed water heater in the form of the usual shell with flues therein; a fire-box at one end of said shell supplying heat to said flues and having water and steam tubes forming the sides and top of the fire-box; means to conduct only feed water from said shell to said tubes; and means to prevent the steam in said tubes from passing into the water space of said shell.

9. A unitary boiler structure of the locomotive type comprising, in combination, a feed water heater in the form of the usual shell with flues therein; a fire-box at one end of said shell supplying heat to said flues and having upright tubes constituting the sides of the fire-box and communicating one with another; a water tube steam generator heated by said fire-box; means to conduct only feed water from said shell to said side tubes and generator; and means to prevent the steam in said generator from passing into the water space of said shell.

10. A unitary boiler structure of the locomotive type comprising, in combination, a feed water heater in the form of the usual shell with flues therein; a fire-box at one end of said shell supplying heat to said flues; and a steam generator within the fire-box comprising crossed, inclined tubes; means to conduct only feed water from said shell to said generator; and means to prevent the steam in said generator from passing into the water space of said shell.

11. A unitary boiler structure of the locomotive type comprising, in combination, a feed-water heater in the form of the usual shell with flues therein; a fire-box at one end of said shell supplying heat to said flues and having upright tubes constituting the sides of the fire-box; a water-tube steam generator heated by said fire-box; means to conduct only feed-water from said shell to said tubes and generator; and means to prevent the steam in said generator from passing into the water space of said shell.

12. A locomotive boiler having a fire-box at one end and a smoke-chamber at the other, a water-containing chamber extending from the fire-box to the smoke-chamber, steam generating spaces associated with the fire-box, said spaces being separate from the water-containing chamber, whereby the water in said spaces may be maintained at a higher temperature than that in the chamber, and means connecting the top of the chamber with said steam-generating spaces so that water will only flow into said spaces from the chamber when the latter is filled.

13. In a locomotive boiler, a water-containing chamber and a fire-box separated by a flue-sheet, flues extending from said chamber and opening into the fire-box, a steam-generator associated with the fire-box, said generator being separate from the chamber, whereby the water in the generator may be maintained at a higher temperature than that in the chamber, and means to connect the top of the chamber to the generator so that water will flow into the generator only when the chamber is filled.

14. In a locomotive boiler, the combination with a fire-box and steam-generating spaces around said fire-box, of a water-containing chamber which terminates at one end at the fire-box and extends forwardly therefrom, said chamber being separate from the steam-generating spaces, whereby the water in said chamber and said spaces may be maintained at different temperatures, and means to connect the top of said chamber to said spaces.

15. A locomotive boiler, having a fire-box at one end, a water-containing chamber extending from said fire-box toward the front of the boiler, flues extending from the fire-box through said chamber, steam-generating water tubes within the fire-box, means connecting the top of the chamber with the lower ends of said water-tubes, and a steam chamber in which the steam collects, said steam chamber being connected in series with the water-containing chamber and water tubes.

16. In a locomotive boiler, a shell forming the body of the boiler and having an outlet at or near its top, a fire-box at one end of the shell, water-tubes forming the sides of the fire-box, means connecting the outlet from the shell to the lower ends of said water-tubes, and a steam space communicating with said water-tubes.

17. In a locomotive boiler, a water-receiving shell forming the body of the boiler, a fire-box at one end fo said shell, water-tubes forming the sides and top of the fire-box, means to deliver water from the upper portion of the shell to the lower ends of said tubes and a steam space connected in series with the water-tubes and shell.

18. In a locomotive boiler, a water-receiving shell forming the body of the boiler, a fire-box at one end thereof, water-tubes forming the sides of the fire-box, other water-tubes within the fire-box, means to deliver water from the upper end of the shell to the lower end of said water-tubes and a steam-dome communicating only with said water-tubes.

19. In a locomotive boiler, a shell forming the body of the boiler, a fire-box at one end thereof, and vertically extending water-tubes at the sides of the fire-box said water tubes being connected with each other at their lower ends, the water-tubes on each side of the fire-box adjacent the shell forming down-takes to conduct the water from the shell to the lower ends of the other water-tubes.

20. In a locomotive boiler, a shell forming the body of the boiler, a fire-box at one end thereof, and vertically extending water-tubes at the sides of the fire-box said water tubes being connected together at their lower ends, the water-tubes on each side of the fire-box adjacent the shell being connected at their upper ends to the upper portion of the shell and at their lower ends to the lower ends of the other water-tubes.

21. In a locomotive boiler, a shell forming the body of the boiler, a fire-box at one end thereof, and water-tubes at the sides of the fire-box, the water-tubes on each side of the fire-box adjacent the shell being connected at their upper ends to the upper portion of the shell and at their lower ends to the lower ends of the other water-tubes, the tubes within the fire-box connected to the tubes at the sides of said fire-box.

22. In a locomotive boiler, a shell forming the body of the boiler, a fire-box at one end thereof, water-tubes at the sides of the fire-box, the water-tubes on each side of the fire-box adjacent the shell being connected at their upper ends to the upper portion of the shell and at their lower ends to the lower ends of the other water-tubes, and crossed inclined tubes within the fire-box.

23. In a locomotive-boiler having a fire-box at one end and a smoke-chamber at the other, a water-containing chamber extending from the fire-box to the smoke-chamber, a steam generator at the fire-box end of the boiler, and means within the smoke-chamber to initially heat the feed water, said means, water-containing chamber and steam generator being connected in series.

24. In a locomotive boiler, a fire-box having its sides formed by closely arranged vertically extending water-tubes, a smoke-chamber, a water containing chamber extending from the fire-box to the smoke-chamber, and means to connect the top of said water containing chamber to the bottom of the water-tubes at the sides of the fire-box.

25. In a locomotive boiler, a fire-box having its sides formed by closely arranged vertically-extending water-tubes, a smoke-chamber, a water containing chamber extending from the fire-box to the smoke-chamber, means to connect the top of said water-containing chamber to the bottom of the water-tubes at the sides of the fire-box, and a steam-dome communicating with the upper end of said water-tubes.

26. In a locomotive boiler, a fire-box having its sides and top formed by closely arranged water-tubes running perpendicularly to the length of the boiler, a smoke-chamber, a water-containing chamber extending from the fire-box to the smoke chamber, and means to connect said chamber with the water-tubes of the fire-box.

27. In a locomotive boiler, a shell having a fire-box at one end and a smoke-chamber at the other, a water-containing chamber extending from the fire-box toward the front of the boiler, said chamber terminating at the fire-box, and the latter having steam generating spaces which are separate from said chamber, and means to connect the top of said chamber to said steam generating spaces whereby the water will flow into the spaces only when the chamber is full.

28. In a locomotive boiler having at one end a fire-box provided with steam generating spaces, a water-containing chamber terminating at the fire-box and extending forwardly therefrom, means to connect the top of said chamber to the bottom of the steam generating spaces, and means within the fire-box to superheat the steam generated in said steam generating spaces.

In testimony whereof, I affix my signature in the presence of two witnesses.

JAMES M. McCLELLON.

Witnesses:
HENRY T. WILLIAMS,
ROBERT H. KAMMLER.